(12) United States Patent
Fansler et al.

(10) Patent No.: US 6,998,179 B2
(45) Date of Patent: *Feb. 14, 2006

(54) PROCESS FOR PREPARING A K-TYPE POLARIZER

(75) Inventors: Duane D. Fansler, Dresser, WI (US); Todd D. Jones, Saint Paul, MN (US); Babu N. Gaddam, Woodbury, MN (US); Robert T. Fitzsimons, Minneapolis, MN (US); Steven M. Heilmann, Afton, MN (US); John J. Cael, Upton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/872,749

(22) Filed: Jun. 21, 2004

(65) Prior Publication Data

US 2004/0241480 A1 Dec. 2, 2004

Related U.S. Application Data

(62) Division of application No. 10/074,874, filed on Feb. 12, 2002, now Pat. No. 6,808,657.

(51) Int. Cl.
*B32B 27/30* (2006.01)

(52) U.S. Cl. .............. 428/519; 428/520; 428/522; 428/910

(58) Field of Classification Search ............ 428/220, 428/222, 910, 519, 520, 522
See application file for complete search history.

(56) References Cited

U.S. PATENT DOCUMENTS

| | | | |
|---|---|---|---|
| 2,445,555 A | 7/1948 | Binda | |
| 2,736,721 A | 2/1956 | Dexter | |
| RE24,906 E | 12/1960 | Ulrich | |
| 3,551,027 A * | 12/1970 | Alexander | ............ 359/485 |
| 3,565,985 A | 2/1971 | Schrenk et al. | |
| 3,647,612 A | 3/1972 | Schrenk et al. | |
| 3,914,017 A | 10/1975 | Bedell et al. | |
| 3,936,538 A | 2/1976 | Marshall et al. | |
| 3,987,037 A | 10/1976 | Bonham et al. | |
| 4,229,498 A | 10/1980 | Suzuki et al. | |
| 4,293,585 A | 10/1981 | Imada et al. | |
| 4,330,590 A | 5/1982 | Vesley | |
| 4,391,687 A | 7/1983 | Vesley | |
| 4,396,642 A | 8/1983 | Bolt et al. | |
| 4,396,646 A | 8/1983 | Schuler et al. | |
| 4,493,807 A | 1/1985 | Vyvial et al. | |
| 4,544,724 A | 10/1985 | Sogah et al. | |
| 4,659,523 A | 4/1987 | Rogers et al. | |

(Continued)

FOREIGN PATENT DOCUMENTS

EP 0 333 407 9/1989

(Continued)

OTHER PUBLICATIONS

Cael et al., "Molecular and Spectroscopic Properties of a Polarizer Based on a Block Copolymer of Vinylalcohol and Acetylene", Macromol. Symp., 154, pp. 45-57, (2000).

(Continued)

*Primary Examiner*—D. Lawrence Tarazano
(74) *Attorney, Agent, or Firm*—Kent S. Kokko (57) ABSTRACT

A process for preparing a polarizer is described whereby an article comprising an oriented, vinylalcohol polymer film layer, and an acid donor layer comprising a photoacid generator, is exposed to radiant energy at a temperature sufficient to effect a partial dehydration of the vinylalcohol polymer to a vinylalcohol/poly(acetylene) copolymer.

29 Claims, 2 Drawing Sheets

U.S. PATENT DOCUMENTS

| | | | |
|---|---|---|---|
| 4,772,663 | A | 9/1988 | Marten et al. |
| 4,818,624 | A | 4/1989 | Downey, Jr. |
| 4,833,179 | A | 5/1989 | Young et al. |
| 4,859,039 | A | 8/1989 | Okumura et al. |
| 4,895,769 | A | 1/1990 | Land et al. |
| 4,948,857 | A | 8/1990 | Marten et al. |
| 4,985,340 | A | 1/1991 | Palazzotto et al. |
| 4,992,218 | A | 2/1991 | Sugio et al. |
| 5,112,882 | A | 5/1992 | Babu et al. |
| 5,209,971 | A | 5/1993 | Babu et al. |
| 5,389,324 | A | 2/1995 | Lewis et al. |
| 5,461,134 | A | 10/1995 | Leir et al. |
| 5,554,664 | A | 9/1996 | Lamanna et al. |
| 5,578,404 | A | 11/1996 | Kliem |
| 5,589,122 | A | 12/1996 | Leonard et al. |
| 5,599,602 | A | 2/1997 | Leonard et al. |
| 5,660,922 | A | 8/1997 | Herridge et al. |
| 5,666,223 | A | 9/1997 | Bennett et al. |
| 5,705,267 | A | 1/1998 | Starzewski et al. |
| 5,925,289 | A | 7/1999 | Cael et al. |
| 5,973,834 | A | 10/1999 | Kadaba et al. |
| 6,409,328 | B1 | 6/2002 | Ohkawa |
| 6,630,970 | B1 | 10/2003 | Gordon et al. |
| 6,808,657 | B1 * | 10/2004 | Fitzsimons et al. ........ 264/1.34 |
| 2003/0002154 | A1 | 1/2003 | Trapani et al. |
| 2003/0017856 | A1 | 1/2003 | Kotchick et al. |
| 2003/0170478 | A1 * | 9/2003 | Cael et al. .................. 428/515 |
| 2003/0189275 | A1 * | 10/2003 | Cael et al. .................. 264/492 |
| 2003/0190491 | A1 * | 10/2003 | Jones et al. ................. 428/500 |

FOREIGN PATENT DOCUMENTS

| | | |
|---|---|---|
| EP | 1 057 623 A1 | 12/2000 |
| JP | 09197669 | 7/1997 |
| WO | WO 95/17691 | 6/1995 |
| WO | WO 97/21123 | 6/1997 |

OTHER PUBLICATIONS

Dietliker, "Chemistry and Technology of UV and EB Formulation for Coatings, Inks and Paints", vol. III, SITA Technology Ltd., London, (1991).

Encyclopedia of Polymer Science and Technology, vol. 1, Interscience Publishers, N.Y., (1964).

Encyclopedia Of Polymer Science And Engineering, "Barrier Polymers", vol. 2, Wiley-Interscience Publishers, N.Y., pp. 177-192, (1985).

Encyclopedia of Polymer Science and Engineering, vol. 13, Wiley-Interscience Publishers, N.Y., (1988).

Handbook of Pressure-Sensitive Adhesives, D. Satas, Editor, $2^{nd}$ Edition, Von Nostrand Reinhold, N.Y., (1989).

Kirk-Othmer Encyclopedia of Chemical Technology, "Lithographic Resists", $4^{th}$ Edition, Supplement Volume, John Wiley & Sons, N.Y., pp. 253-257.

Murov, Handbook of Photochemistry, Marcel Dekker Inc., N.Y., pp. 27-35 (1973).

Wakabayashi et al., "Studies on s-Triazines. I. Cotrimerization of Trichloroacetonitrile with Other Nitriles", Bulletin of the Chemical Society of Japan, vol. 42, pp. 2924-2930, (1969).

* cited by examiner

PROCESS FOR PREPARING A K-TYPE POLARIZER

This application is a divisional of U.S. Ser. No. 10/074,874, filed Feb. 12, 2002, now U.S. Pat. No. 6,808,657, the disclosure of which is herein incorporated by reference.

FIELD OF THE INVENTION

The present invention is directed at a process for preparing a K-type polarizer characterized by a uniaxially oriented film of poly(vinylalcohol) having light polarizing (dichroic) blocks of conjugated poly(acetylene).

BACKGROUND

Dichroic polarizers are absorptive, linear polarizers having a vectoral anisotropy in the absorption of incident light. The polarizer, therefore, has the property of differential absorption (and transmission) of the components of an incident beam of light depending on the direction of vibration of the components. Generally, the polarizer will transmit radiant energy along one electromagnetic vector and absorb energy along a perpendicular electromagnetic vector. A beam of incident light, on entering the dichroic polarizer, encounters two different absorption coefficients, one low and one high so that the emergent light vibrates substantially in the direction of low absorption (high transmission).

The development of synthetic polarizers has made possible the widespread utility of light-polarizing elements for a wide variety of applications, such as in liquid crystal display screens in which crossed polarizers are used in conjunction with an addressable liquid crystal material to provide the basis for image formation. Polarizers have also been used in many optical applications, such as to reducing glare or the brightness of specular reflection in photography or CRT monitors to reduce glare.

Among the known synthetic polarizers are "K-type" polarizers in which the linear dichroic light polarizing materials are prepared by dehydration of poly(vinyl alcohol). K-type polarizers may also be known as inherent polarizers since the absorbing chromophore is the result of conjugation in the polymer backbone, rather than due to dyes added to the polymer matrix. These polarizers comprise a sheet of oriented poly(vinyl alcohol) having light polarizing (dichroic) molecules of poly(acetylene) blocks (i.e. —[CH=CH—]$_n$ In formed by heating the oriented poly(vinyl alcohol) sheet in the presence of a dehydration catalyst such as vapors of aqueous hydrochloric acid. By orienting the poly(vinyl alcohol) matrix uniaxially the transition moments of the chromophores, the conjugated poly(acetylene) blocks, are also oriented and the material becomes visibly dichroic.

While K-type polarizers can be made by conventional acid processes, these processes necessarily involving the handling of, and potential exposure to, hazardous quantities of acid, usually hydrochloric acid. Additionally, the vapor-phase acid processes can result in non-uniform catalytic dehydration, which can lead to streaking or mottling of the polarizer, rendering it unsuitable for many precision optical applications. See, for example U.S. Pat. No. 5,773,834 (Kadaba et al.). Hence, there is a need for a process for preparing K-type polarizers that does not use large quantities of hazardous and corrosive acids (such as HCl vapors) to effect dehydration and can produce high quality, uniform polarizers.

SUMMARY OF THE INVENTION

The present invention provides a process for preparing a polarizer whereby an article comprising an oriented, vinylalcohol polymer film layer, and an acid donor layer comprising a photoacid generator, is exposed to radiant energy at a temperature sufficient to effect partial dehydration of the vinylalcohol polymer to a vinylalcohol/poly(acetylene) copolymer. When exposed to radiant energy, typically ultraviolet light, the photoacid generator reacts photochemically to release one or more molecules of acid. The incipient acid then reacts catalytically with the vinylalcohol polymer to dehydrate it, producing a vinylene segment (i.e. —CH=CH—, which may also be referred to as poly(acetylene) blocks) along the chain of the vinylalcohol polymer. As the reaction proceeds, these vinylene segments grow in number and produce varying lengths of conjugated vinylene segments, the segments being relatively uniformly distributed in the polymer matrix. For example, the polymer resulting from partially dehydrated poly(vinylalcohol) may have the general structure:

where —(CH$_2$—CHOH—)$_a$— represent blocks of poly(vinyl alcohol), —(CH=CH)$_b$— represents conjugated blocks of poly(acetylene), a and b are numbers such that a+b is at least 500, preferably at least 1000, a>b, and b is sufficiently large to produce a conjugated chromophore. Generally b is about 2 to 30. It will be understood that a particular polymer chain may comprise more than one of the above blocks. The conjugated blocks of —(CH=CH)$_b$— may also be referred to as vinylene blocks or poly(acetylene) herein.

The orientation of the polymer chains in combination with the concentration of the blocks of conjugated vinylene blocks imparts a dichoism to the film layer. Concurrent with, or subsequent to, the photochemical reaction, the article may be heated at a temperature, and for a time, sufficient to effect the desired degree of dehydration and concurrent production of conjugated vinylene blocks (poly(acetylene) blocks).

The present invention provides a pre-polarizer article comprising an oriented vinyl alcohol polymer layer and an acid donor layer. The photoacid generator is dissolved or dispersed in the donor layer and upon irradiation the incipient acid diffuses into the adjacent vinylalcohol polymer matrix to effect partial dehydration of the vinylalcohol polymer to conjugated vinylene [poly(acetylene)] segments. As used herein "pre-polarizer" refers to an article having the aforementioned construction, and which, upon irradiation and heating, is converted to a K-type polarizer. The pre-polarizer article may further include a support layer for providing mechanical strength to the vinylalcohol polymer layer. The pre-polarizer article may further include a barrier layer for directing the diffusion of the incipient acid molecules and/or reducing loss of the acid from the exposed surfaces, and/or improving moisture resistance. The pre-polarizer article may further include an adhesive layer for securing the pre-polarizer, or the subsequently generated polarizer to a substrate. Advantageously the pre-polarizer allows one to produce custom polarizers with specified patterns or indicia, or with custom optical properties on an as-needed basis.

The method of the present invention overcomes deficiencies of the prior art by avoiding the use of large quantities of corrosive acid, whether in baths, in fuming processes, or as coatings in the processing steps. The use of a photoacid generator allows one to reduce the amount of acid necessary to effect the desired dehydration (relative to prior art), reduces potential hazardous exposure to the acid, while the production of the photo-generated acid can easily be controlled by control of the incident light. The method advantageously can produce high quality, uniform polarizers using conventional processing equipment and readily available polymers and photoacid generators. Further, the method may be used to produce polarizers bearing preselected patterns.

DETAILED DESCRIPTION

The present polarizer may be made by partial dehydration of an oriented vinylalcohol polymer film by irradiation in the presence of a photoacid generator. Vinylalcohol polymers include any linear 1,3-polyhydroxylated polymer or copolymer, or derivative thereof that may be dehydrated to a linear, conjugated vinylic polymer. Useful vinylalcohol polymers include polymers and copolymers of units of the formula:

wherein R is H, a $C_1$–$C_8$ alkyl, or an aryl group; and R' is H, or a hydrolysable functional group such as a $C_1$–$C_8$ acyl group. Preferably, R and R' are H. In addition to poly(vinyl alcohol) polymers and copolymers, specifically contemplated are polyvinyl acetals and ketals and esters. Useful co-monomers that may be polymerized with the vinylalcohol monomers to produce vinylalcohol copolymers may include any free-radically polymerizable monomers including olefins, such as ethylene, propylene and butylene, acrylates and methacrylates such as methyl(meth)acrylate, vinyl acetates and styrenes. Specifically contemplated for use in the present invention are copolymers of ethylene and vinylalcohol. Generally, the amount of co-monomer is less than 30 mole % and is preferably less than 10 mole %. Higher amounts may retard the formation of conjugated vinylene blocks [poly(acetylene) blocks) and deleteriously affect the performance of the polarizer.

The preferred vinylalcohol polymers are homo- and copolymers of polyvinyl alcohol. Most preferred are polyvinyl alcohol homopolymers. Commercially available polyvinyl alcohols, such as those available from Celanese Chemicals, Inc., Dallas, Tex., under the tradename CELVOL, are classified by viscosity and percent hydrolysis. Polyvinyl alcohols having low viscosities are preferred for ease of coating, while having a sufficiently high molecular weight to provide adequate moisture resistance and good mechanical properties.

Melt-processible polyvinyl alcohol may also be used in this invention. The melt processible vinylalcohol polymers are plasticized to enhance their thermal stability and allow them to be extruded or melt-processed. The plasticizer can be added externally or in the vinylalcohol polymer chain, i.e., the plasticizer is polymerized or grafted onto the vinylalcohol polymer backbone.

Vinylalcohol polymers that can be externally plasticized include commercially available products such as "Mowiol" 26–88 and "Mowiol" 23–88 vinylalcohol polymer resin available from Clariant Corp., Charlotte, N.C. These "Mowiol" vinylalcohol polymer resins have a degree of hydrolysis of 88%. "Mowiol" 26–88 vinylalcohol polymer resin has a degree polymerization of 2100 and a molecular weight of about 103,000.

Plasticizers useful in externally plasticizing vinylalcohol polymer are high boiling, water-soluble, organic compounds having hydroxyl groups. Examples of such compounds include glycerol, polyethylene glycols such as triethylene glycol and diethylene glycol, trimethylol propane, and combinations thereof. Water is also useful as a plasticizer. The amount of plasticizer to be added varies with the molecular weight of the vinylalcohol polymer. In general, the plasticizer will be added in amounts of between about 5% to about 30%, and preferably between about 7% to about 25%. Lower molecular weight vinylalcohol polymers typically require less plasticizer than higher molecular weight vinylalcohol polymers. Other additives for compounding externally plasticized vinylalcohol polymers include processing aids (i.e. Mowilith DS resin from Hoechst A. G.), anti-blocking agents (i.e., stearic acid, hydrophobic silica), colorants, and the like.

Externally plasticized vinylalcohol polymers are compounded by slowly adding the organic plasticizer (and typically water) to the vinylalcohol polymer powder or pellets under constant mixing until the plasticizer is incorporated into the vinylalcohol polymer, which occurs when the batch reaches a temperature of from about 82° C. (180° F.) to about 121° C. (250° F.). The lower the molecular weight of the vinylalcohol polymer resin, the lower the maximum batch temperature required to incorporate the plasticizer. The batch is held at that temperature for about 5 to 6 minutes. The batch is then cooled to about between 71° C. (160° F.) and 93° C. (200° F.) at which time an anti-blocking agent can be added. The batch is further cooled to about 66° C. (150° F.) at which time the vinylalcohol polymer granulates can be removed from the mixer and extruded.

The compounding steps used to externally plasticize the vinylalcohol polymer can be eliminated when an internally plasticized vinylalcohol polymer is made except where it is desirable to add colorants, etc. Useful internally plasticized vinylalcohol polymers are commercially available. Such products include "Vinex" 2034 and "Vinex" 2025, both available from Air Products, Inc.

The Vinex trademark from Celanese represents a unique family of thermoplastic, water-soluble, polyvinylalcohol resins. Specifically, the "Vinex" 2000 series including "Vinex" 2034 and "Vinex" 2025 represent internally plasticized cold and hot water soluble polyvinylalcohol copolymer resins. Such internally plasticized vinylalcohol copolymers are described in U.S. Pat. No. 4,948,857 herein incorporated by reference. Such copolymers have the following general formula:

where
R is hydrogen or methyl;
$R^1$ is a $C_6$–$C_{18}$ acyl group
y is 0 to 30 mole %;
z is 0.5 to 8mole %; and
x is 70 to 99.5 mole %.

As stated in U.S. Pat. No. 4,948,857 these copolymers are easy to prepare and offer a polymer having good thermoplastic and thermal stability properties. These copolymers retain the strength properties of poly(vinylalcohol) while also exhibiting increased flexibility. The acrylate monomer represented in the above formula gives the copolymer its internal plasticization effect. The degree of polymerization of the copolymers can range from about 100 up to 2500, but is preferably between about 200 and 800. The degree of polymerization is defined as the ratio of molecular weight of the total polymer to the molecular weight of the unit as referenced in formula I. Other internally plasticized poly (vinylalcohol) copolymer resins and preparation of these resins are discussed in U.S. Pat. No. 4,772,663. "VINEX" 2034 resin has a melt index typically of about 8.0 g/10 mins. and a glass transition temperature of about 30° C. (86° F.). "VINEX" 2025 resin has a melt index typically of 24 g/10 mins and a glass transition temperature of about 29° C. (84° F.).

Polyvinyl alcohols and copolymers thereof, are commercially available with varying degrees of hydrolysis, i.e., from about 50% to 99.5+%. Preferred polyvinyl alcohols have a degree of hydrolysis of about 80–99%. In general, the higher the degree of hydrolysis, the better the polarizer properties. Also, polyvinyl alcohols with a higher degree of hydrolysis have better moisture resistance. Higher molecular weight polyvinyl alcohols also have better moisture resistance, but increased viscosity. In the practice of the invention, it is desirable to find a balance of properties in which the polyvinyl alcohol has sufficient moisture resistance, can be handled easily in the coating process (knife coating, roll coating, die coating, curtain coating, etc.), and can be readily oriented. Most commercial grades of poly(vinylalcohol) contain several percent residual water and unhydrolyzed poly(vinyl acetate).

The acid donor layer comprises a separate layer adjacent to the vinylalcohol polymer layer. In the simplest embodiment, the donor layer may comprise a coating of the photoacid generator on a surface of the vinylalcohol polymer layer, or the photoacid generator may be dissolved or dispersed in an adjacent polymer layer.

If the acid donor layer comprises a coating of the photoacid generator on a surface of the vinylalcohol polymer layer, the coating may be an intermediate layer between the vinylalcohol polymer layer and a barrier, support or adhesive layer. Advantageously, the photoacid generator may be pattern coated on the vinylalcohol polymer layer, which may permit the preparation of patterned polarizers. In such cases, the thickness of the donor layer may be very thin; on the order of a few microns If the acid donor layer comprises the photoacid generator dissolved or dispersed in an adjacent polymer layer, the polymer may be chosen from any polymer that is non-reactive toward both the photoacid generator, and incipient acid generated therefrom, and allows diffusion through the polymer matrix into the adjacent vinylalcohol polymer layer. Generally the acid donor layer comprises a coating of a non-basic polymer, which has a high rate of permeability of the incipient acid through the matrix. The donor layer may comprise a hydrophobic polymer. A "hydrophobic" polymer may be defined as a polymer that is substantially insoluble in and will not swell appreciably in water. The donor layer may also comprise an amorphous polymer layer. The rate of permeability is a function of the combination of a low rate of absorption of the incipient acid by the matrix, and high rate of diffusion through the matrix and a high rate of desorption from the interface of the donor layer and into the vinylalcohol polymer layer. Less permeable polymers may also be used for the donor layer, provided a barrier layer is used to prevent the loss of acid from the surface(s). The thickness of such a donor layer may be from about 0.1 to 5 mils. Generally, the amount of photoacid generator in the donor layer is from about 0.1 to 30 wt.%, relative to the weight of the donor layer polymer.

Because the solubility of the incipient acid in, and the diffusion of the incipient acid through the polymer matrix is a function of Henry's and Fick's laws respectively, the $T_g$ of the acid donor layer is preferably at or below 25° C., and is more preferably below about 0° C. Polymers in the glassy state are generally less permeable than those in the rubbery state, so polymers in the rubbery state are useful as donor layers.

As the process of the invention may include a heating step whereby the article is exposed to light and subsequently or concurrently heated to effect dehydration of the vinylalcohol polymer, the decomposition temperature of the donor layer should be above this heating temperature.

In one embodiment, the donor layer may be coated on a surface of the oriented vinylalcohol polymer. Such coating methods may include solution coating from solvent dispersion or solution. Alternatively the donor layer may be coated from the melt, coextruded, or a separately prepared donor layer may be laminated or bonded to the vinylalcohol polymer layer by heat, pressure, or by means of adhesives. If adhesives are used, the intermediate adhesive layers should not deleteriously affect the diffusion of the incipient acid from the donor layer to the vinylalcohol polymer layer.

In one embodiment, the donor layer may be coated on a surface of an unoriented vinylalcohol polymer layer and subsequently oriented. However, orientation of the donor layer may reduce the permeability to the incipient acid.

In one embodiment the donor layer may comprise a layer of pressure sensitive adhesive having the photoacid generator dissolved or dispersed therein. The adhesive donor layer may be coated onto a surface of the vinylalcohol polymer layer, which may be oriented or subsequently oriented as previously described. On photoinitiation and resultant dehydration of the vinylalcohol polymer, such an embodiment advantageously provides a polarizing article having a pressure sensitive adhesive layer for affixing the polarizer to a substrate. Useful adhesives include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones. Useful adhesives are described in more detail below.

The acid donor layer may also be releasably affixed to the vinylalcohol polymer layer. Useful means for releasably affixing the donor layer include: selection of an adhesive having a low affinity for the vinylalcohol polymer, the use of a low-adhesion backsize intermediate layer, using techniques to render the layer non-tacky, such as inducing excessive cross-linking, or by selection of an adhesive which may be dissolved in a solvent which is a non-solvent for the vinylalcohol polymer. By releasably affixing the donor layer, the adjacent vinylalcohol polymer layer may be dehydrated to produce poly(acetylene) blocks, then removed to prevent further release of acid and further dehydration of the vinylalcohol polymer. In one useful embodiment, the polarizer may comprise the construction support layer/vinylalcohol polymer layer/donor layer. In this construction the article may be exposed to radiant energy to effect the desired degree of dehydration, then the donor layer may be removed.

The pre-polarizer article may comprise two or more acid donor layers. In a preferred embodiment, a pre-polarizer is provided comprising two acid donor layers with the vinylalcohol layer disposed therebetween. In this embodiment, the incipient acid generated by irradiation diffuses to the vinyl alcohol layer from both major surfaces. In another preferred embodiment, the pre-polarizer article may comprise alternate layers of donor layer and vinylalcohol layer.

On irradiation with light energy, photoacid generators undergo a fragmentation reaction and release one or more molecules of Lewis or Brönsted acid which diffuses from the donor layer through the vinylalcohol polymer matrix to catalyze the dehydration of the vinylalcohol polymer and form conjugated poly(acetylene) blocks. The released acid molecules may directly or indirectly catalyze the dehydration reaction. By indirectly it is meant that the incipient acid, typically a Lewis acid, may react with hydroxyl groups of the vinylalcohol polymer, or with residual water to produce a Brönsted acid. Useful photoacid generators are thermally stable and do not undergo thermally induced reactions with the donor layer polymer, and are readily dissolved or dispersed therein. Preferred photoacid generators are those in which the incipient acid has a pKa value of ≦0.

The photoacid generators include ionic photoacid generators, including onium salts and organometallic salts, such as iron arene complexes; and nonionic photoacid generators, including organosilanes, latent sulfonic acids and other miscellaneous non-ionic compounds, such as halomethyl triazines (such as those described in U.S. Pat. No. 3,987,037, incorporated herein by reference) and chlorinated acetophenones. Photoacid generators are known and reference may be made to K. Dietliker, *Chemistry and Technology of UV and EB Formulation for Coatings Inks and Paints*, vol. III, SITA Technology Ltd., London, 1991. Further reference may be made to Kirk-Othmer Encyclopedia of Chemical Technology, 4$^{th}$ Edition, Supplement Volume, John Wiley and Sons, New York, year, pp 253–255.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Useful organosilanes include mixtures of silanols and aluminum (III) complexes of β-keto esters or β-diketones; o-notobenzyl triarylsilyl ethers; triarylsilyl peroxides; and acylsilanes.

Useful latent sulfonic acids include α-sulfonyloxy ketones; α-hydroxymethylbenzoin sulfonates; o-nitobenzyl esters of sulfonic acids; aryl diazidonapthaquinone-4-sulfonates; α-sulfonyl acetophenones; methanesulfonate esters of 2-hydroxy and 2,4-dihydroxybenzophenone (in the presence of thiols); sulfonated N-hydroxy amides or imides; and iminosulfonates.

The photoacid generator is used in amounts sufficient to effect the desired degree of dehydration of the vinylalcohol polymer. The desired degree of dehydration may vary, depending on the desired contrast and the film thickness but is typically in the range of 0.1 to 10%, preferably 1 to 5% of the available hydroxyl groups are converted to vinylene groups (i.e. —$CH_2$—CHOH—→—CH=CH—). The amount of the photoacid generator necessary to effect the desired degree of dehydration will depend on the quantum yield of the photoacid generator (the number of molecules acid release per photon absorbed), the pKa of the acid, the permeability of the polymer matrix, the amount of water present in the polymer matrix, the wavelength and duration of irradiation and the temperature. Generally the photoacid generator is used in amounts of 0.1 to 30 wt. %, preferably 1 to 5 wt. %, relative to the amount of vinylalcohol polymer.

Optionally, it is within the scope of this invention to include photosensitizers or photoaccelerators with the photoacid generators. Use of photosensitizers or photoaccelerators alters the wavelength sensitivity of radiation-sensitive compositions employing the latent catalysts and photoacid generators of this invention. This is particularly advantageous when the photoacid generator does not strongly absorb the incident radiation. Use of photosensitizers or photoaccelerators increases the radiation sensitivity, allowing shorter exposure times and/or use of less powerful sources of radiation. Any photosensitizer or photoaccelerator may be useful if its triplet energy is at least 30 kilocalories per mole. Examples of such photosensitizers are given in Table 2-1 of the reference Steven L. Murov, Handbook of Photochemistry, Marcel Dekker Inc., N.Y., 27–35 (1973), and include those described in U.S. Pat. No. 4,985,340, and such description is incorporated herein by reference. When present, the amount of photosensitizer or photoaccelerator used in the practice of the present invention is generally less than 10 and preferably less than 1.0 wt % of photosensitizer or photoaccelerator based on the weight of the photoacid generator.

The article may further comprise a support layer. The oriented vinylalcohol polymer is generally weak in the direction transverse to the direction of orientation, and is readily split or fibrillated when subject to transverse stress. A support layer, when bonded or otherwise affixed to the oriented, vinylalcohol polymer film provides mechanical strength and support to the article so it may be more easily handled and further processed. Preferably the support layer is substantially transparent over the optical region of interest, which is typically 300 to 800 nm. By "substantially transparent" it is meant that the support layer has a transmittance value of at least about 50%, preferably at least 75%, more preferably at least 90% over the optical region of interest. However, in some embodiments the support layer need not be optically transparent, provided that at least one major surface of the vinylalcohol polymer film may be exposed to light energy. Thus for example, a support layer bonded to the vinylalcohol polymer layer may not be substantially optically transparent if the opposite surface of the vinylalcohol polymer may be irradiated.

Any suitable material may be used as a support layer that may be bonded or affixed to the vinylalcohol polymer layer, and which does not deleteriously affect the optical characteristics of the polarizer. Useful transmissive polymers include cellulose esters, such as nitrocellulose and cellulose acetate; polyesters, polycarbonates, and acrylates. A preferred polymer is polyethylene terephthalate.

The support layer is typically in the range of 0.5 mil to 20 mil (13 µm to 510 µm) in thickness. The support layer and the vinylalcohol polymer layer may be bonded by any suitable means, including lamination, and adhesives. With suitable melt-processible vinylalcohol polymers, the two layers may be coextruded, or the vinylalcohol polymer may be melt-coated onto the surface of the support layer.

In one embodiment, the support layer may be releasably affixed to the oriented vinylalcohol polymer film. The support layer may be releasably affixed to the vinylalcohol polymer layer using, for example, a combination of a pressure sensitive adhesive and a low-adhesion backsize (LAB). Either the adhesive or the low adhesion backsize may be coated on the surface of the support layer. If the pressure sensitive adhesive is coated on the surface of the support layer and a low-adhesion backsize is coated on the surface of the vinylalcohol polymer layer, the adhesive will remain with the support layer upon removal. Conversely if the pressure sensitive adhesive is coated on the surface of the vinylalcohol polymer layer and a low-adhesion backsize is coated on the surface of the support layer, the adhesive will remain with the vinylalcohol polymer layer upon removal.

It is preferred that if a transmissive polarizer is desired, the support layer be substantially transmissive or if not sufficiently transmissive, be releasably affixed to the oriented vinylalcohol polymer layer.

The polarizer may further comprise one or more barrier layers for directing the diffusion of the incipient acid molecules and/or reducing loss of the acid from the exposed surfaces. A barrier layer may be bonded to one or more exposed surfaces of the oriented, vinylalcohol polymer layer, or may be bonded to an exposed surface of the acid-donor layer if such a layer is present. In one preferred embodiment the polarizing article comprises an acid donor layer having on one major surface an oriented vinylalcohol polymer layer affixed thereto, and a barrier layer affixed to the other major surface of the donor layer. In such a construction, i.e. vinylalcohol polymer layer/donor layer/ barrier layer, the loss of incipient acid is prevented by the barrier layer and instead the incipient acid is directed toward the vinylalcohol polymer layer, where it may react to effect dehydration. Such a construction may further comprise a second barrier layer, i.e. barrier layer/vinylalcohol polymer layer/donor layer/barrier layer, where further loss of incipient acid is prevented.

The barrier layer may be prepared from any material that is non-reactive with the incipient acid, and which prevents diffusion losses of the incipient acid upon exposure to light energy. To minimize permeation of the incipient acid through the barrier layer, the $T_g$ of the barrier layer is generally above the operating temperature of the process of this invention, so the barrier layer is in the glassy state as incipient acid is generated. In one embodiment the Tg of the polymer is generally at least 25° C., is preferably is at least 50° C. and most preferably at least 100° C. In another embodiment, highly crystalline polymers, such as polypropylene and polyethylene may be used as a barrier layer.

The permeability coefficient of the barrier layer to HCl is less than that of the donor layer and is generally about 20 mol/m*s*Pa×10$^{-15}$ at 23° C. and is preferably less than about 1 mol/m*s*Pa×10$^{-15}$ at 23° C.

Preferably the barrier layer comprises a polymer film layer that is coated, bonded or otherwise affixed to a major surface of the donor layer. If desired, the barrier layer may be releasable affixed to the vinylalcohol polymer film layer, so that it can be removed after exposure to light energy and dehydration of the vinylalcohol polymer.

Preferably the barrier layer is substantially transparent over the optical region of interest, which is typically 300 to 800 nm. However, in some embodiments the barrier layer need not be optically transparent, provided that at least one major surface of the vinylalcohol polymer film may be exposed to light energy.

If desired, the same layer may serve as both a support layer and barrier layer provided the layer both improves the mechanical strength of the article and prevents diffusion of the incipient acid.

If desired an adhesive layer may be applied to a major surface of the polarizer of the invention. As previously described, the donor layer may comprise an adhesive layer having the photoacid generator dispersed therein. Typically, the adhesive layer would be applied to a major surface of the support layer of the polarizer, producing the construction vinylalcohol film layer/support layer/adhesive layer. The adhesive layer may be activated by pressure, heat, solvent or any combination thereof and may be of any type based on a poly(α-olefin), a block copolyme, an acrylate, a rubber/ resin, or a silicone. The adhesive may be applied at conventional coating weights (e.g., 0.0001 to 0.02 g/cm$^2$) using any conventional coating means such a rotary rod die, slot die or a gravure roll. The support layer may also be treated with a conventional primer coating, and/or activated by flame or corona discharge, and/or by another surface treatment to enhance adhesion of the adhesive layer thereto.

When a pressure sensitive adhesive (psa) layer is used, pressure sensitive adhesives useful in the present invention can be self-tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones. Examples of suitable pressure sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), U.S. Pat. No. 5,461,134 (Leir et al.), U.S. Pat. No. 4,391,687 (Vesley), U.S. Pat. No. 4,330,590 (Vesley) and U.S. Pat. No. 5,112,882 (Babu), the entire disclosure of which is incorporated herein by reference. Others are described in the *Encyclopedia of Polymer Science and Engineering*, vol. 13, Wiley-Interscience Publishers, New York, 1988, the *Encyclopedia of Polymer Science and Technology*, vol. 1, Interscience Publishers, New York, 1964 and *Handbook of Pressure-Sensitive Adhesives*, D. Satas, Editor, 2$^{nd}$ Edition, Von Nostrand Reinhold, N.Y., 1989.

Figure 1:
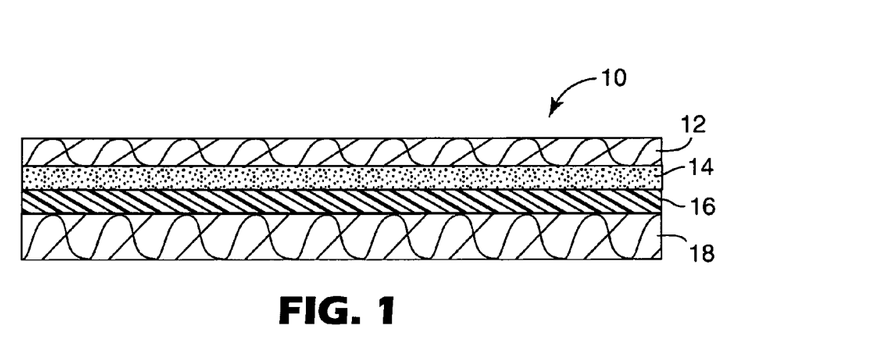
FIG. 1 is a cross-section of the pre-polarizer of the present invention.

With reference to FIG. 1, the prepolarizing article 10 comprises an optional barrier layer 12 affixed to a major surface of donor layer 14. The donor layer 14 is affixed to the oriented vinyl alcohol polymer layer 16, supported by optional support layer 18.

The dichroic polarizer may be prepared by solution coating a vinylalcohol polymer, such as polyvinyl alcohol, onto a carrier web, heated roller or support layer. Coating of the dispersion/solution may be accomplished by a variety of known methods, including, for example, coating the substrate using techniques, such as shoe coating, extrusion coating, roll coating, curtain coating, or any other coating method capable of providing a uniform coating. The substrate may be coated with a primer or treated with a corona discharge to help anchor the polyvinyl alcohol film to the substrate. After coating, the polyvinyl alcohol film is dried at a temperature typically between 100° C. and 150° C. The thickness of the dried coating may vary depending on the optical characteristics desired but is typically from 25 to 125 μm (1–5 mils).

Alternative to solution coating, the vinylalcohol polymer layer may also be melt-processed. As with solution coating, a melt comprising the vinylalcohol may be cast onto a carrier web, or preferably a support layer. The vinylalcohol polymer film may also be melt-blown. The vinylalcohol polymer melt may also be coextruded with any of the donor layer, the support layer, the barrier layer and/or the adhesive layer by means known in the art.

Coextruded articles can be made using a variety of equipment and a number of melt-processing techniques (typically, extrusion techniques) well known in the art. Such equipment and techniques are disclosed, for example, in U.S. Pat. Nos. 3,565,985 and 3,647,612 (Schrenk et al.), U.S. Pat. Nos. 5,589,122 and 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the types of materials extruded.

The support layer can be primed for adhesion before coating by solution coating on an inorganic or polymeric primer layer, corona treatment, or by physical treatment. Suitable solution based primers for these applications are water-soluble copolyesters commonly used for priming polyethylene terephthalate films such as described in U.S. Pat. No. 4,659,523. The vinylalcohol polymer coating solution should contain between 2 and 20% polymer in water based on weight, with the preferred concentration being between 5 and 15%. The vinyl alcohol polymer generally has a degree of hydrolysis of between 80 and 100%, preferably 95 and 100%, most preferably between 97 and 99.5.

The donor layer may be coated, as a solution or dispersion containing the photoacid generator, onto a major surface of the vinylalcohol polymer film (optionally having a support layer). This layer may preferably be added after orientation of the vinylalcohol polymer film. The donor layer may comprise a layer of the neat photoacid generator, or may comprise a mixture of the photoacid generator in a polymer matrix. Alternatively, a dispersion of the photoacid generator in a polymer may be melt-coated onto or coextruded with the vinylalcohol polymer film. Generally, the amount of photoacid generator is from about 0.1 to 30 wt. %, relative to the weight of the vinylalcohol polymer and may be 0.1 to 20 wt. % of the donor layer polymer matrix.

The vinylalcohol polymer film is oriented, preferably at elevated temperatures, to develop oriented vinylalcohol polymer. The temperature is preferably above the glass transition temperature of the vinylalcohol polymer layer. In general, the temperature should be between 80 and 185° C., preferably between 100 and 185° C. The film may be uniaxially stretched from 2 to 10 times the original dimension. Preferably, the film will be uniaxially stretched from 3 to 7 times the original dimension. The film may be stretched in the machine direction, as with a length orienter, in width using a tenter, or at diagonal angles. Due to the relative weak transverse strength of an oriented vinylalcohol polymer, it is advantageous to cast, laminate or otherwise affix the oriented film onto a support film layer as previously described. However the cast film may be oriented and subsequently bonded or affixed to a support film layer after orientation. Useful methods of orientation are known in the art and reference may be made to U.S. Pat. No. 5,973,834 (Kadaba et al.), U.S. Pat. No. 5,666,223 (Bennett et al.) and U.S. Pat. No. 4,895,769 (Land et al.)

It will be understood however, that in uniaxial orientation, the film may be restrained from shrinking in the lateral direction by means of a tenter apparatus, and such restraint does impose a small degree of biaxial orientation to the film. It is preferred to restrict the stretching in the transverse direction to less than 2×. It is believed that the performance of the polarizer is compromised if the film is oriented in first direction (e.g. in the machine direction) and subsequently oriented in the perpendicular direction more than 2×, as result of restraint from shrinking.

In general, the degree of orientation of the vinylalcohol polymer layer, and the degree of dehydration to conjugated poly(acetylene) blocks is sufficient to impart a maximum dichroic ratio, $R_D$ of greater than 1.1, generally 5 to 10, prior to the stabilization step (described in detail below). The dichroic ratio is defined as: $R_D = A_=/A_\perp$ where $A_=$ and $A_\perp$ are the absorption constant in the directions parallel and perpendicular to the direction of orientation respectively. Absorption may be measured using a UV/VIS spectrophotometer having a polarizer placed in both the sample and reference beams. For measurement of the dichroic ratio (the dichroic ratio averaged over the spectral region of interest) the sample and reference beams are both white light. An absorption spectrum between 300 and 800 nm is measured with the optical axis of a film sample being parallel to the optical axis of the polarizer in the sample beam, and then after rotating the sample polarizer 90°. Thus the absorption at the wavelength of maximum absoptivity, denoted by $A_=$ and $A_\perp$, are determined, from which RD can be calculated.

The temperature of the first orientation (or stretching) affects film properties. Orientation temperature control may be achieved by controlling the temperature of heated rolls or by controlling the addition of radiant energy, e.g., by infrared lamps, as is known in the art. A combination of temperature control methods may be utilized.

If desired, the support layer may be oriented in a direction substantially transverse to the direction of orientation of the vinylalcohol polymer film. By substantially transverse, it is meant that the support layer may be oriented in a direction ±45° from the direction of orientation of the vinylalcohol polymer film layer. Such orientation of the support layer provides greater strength in the transverse direction than does an unoriented support layer.

In practice, the support layer may be oriented before or after coating of the vinylalcohol polymer layer. In one embodiment the vinylalcohol polymer may be oriented substantially uniaxially and bonded to an oriented support layer so that the directions of the orientations of the two layers are substantially transverse. In another embodiment, the support layer may oriented in a first direction, the vinylalcohol polymer bonded or coated thereon, and the composite article oriented in a second direction substantially transverse to the direction of first orientation. In this embodiment, the resulting article comprises a biaxially oriented support layer, and a substantially uniaxially oriented vinylalcohol polymer layer.

Generally the support layer, if oriented, will be stretched from about 2× to 10× in a substantially transverse direction, and may further be oriented 2× to 10× in the same direction as the vinylalcohol polymer film, depending on the polymer used and the desired mechanical properties of the polarizing article. After stretching the support layer may be heat set, using conventional means.

The resulting article may be irradiated with actinic radiation to produce the incipient acid, which subsequently diffuses into and/or through the vinylalcohol polymer layer to catalyze dehydration thereof, thereby producing conjugated blocks of poly(acetylene). "Actinic radiation" means that radiation having a wavelength between 200 and 600 nm, preferably between 280 and 450 nm, more preferably between 300 and 450 nm, and which can be obtained from, for example, sunlight, mercury vapor and carbon arcs, black light and fluorescent lamps, argon and xenon glow lamps, electronic flash systems, and flood lamps. Intensities of the actinic radiation can range from about 0.1 to about 150 mW/cm$^2$, preferably from about 0.5 to about 100 mW/cm$^2$, and more preferably from about 0.5 to about 50 mW/cm$^2$. Preferably, the photoacid generator used has an absorbance maximum of about 280 nm or greater meaning it will not absorb in the same spectral region as do the polymer matrices. Such photoacid generators may be present in an amount of from 0.1 to 30, preferably 1 to 5 weight percent, relative to the vinylalcohol polymer.

Where actinic radiation is to be used to generate the incipient acid, high intensities and short exposure times are preferred. For example, an intensity of 600 mW/cm$^2$ with an exposure time of about 1 second can be used successfully. However, longer exposure times and lower radiation doses also are contemplated and within the scope of the present invention. If desired, the degree of conversion of the vinylalcohol polymer to the poly(acetylene) blocks can be determined by UV/VIS spectroscopy in which the absorption at a wavelength corresponding to the conjugated poly(acetylene) chromophore is measured.

The use of a photoacid generator may produce residue products from the photochemical production of acid. For example, an onium salt such as triarylsulfonium chloride produces aryl sulfides on irradiation, in addition to the desired acid. Such residues are present in small amounts and do not normally interfere with the desired optical properties of the resulting polarizer. The residues may be found in the donor layer. The residues may be detected by conventional analytical techniques, such as infrared, ultraviolet and NMR spectroscopy, gas or liquid chromatography, mass spectroscopy, or a combination of such techniques. Thus, the present invention may comprise an oriented vinylalcohol film layer, a donor layer and detectable amounts of residues from a photoacid generator.

Where desired, only preselected areas of the article may be exposed to radiant energy, with the result that only corresponding areas of the vinylalcohol polymer are dehydrated to produce poly(acetylene) blocks and a patterned polarizer results. Thus, the present invention provides a polarizer comprising at least one layer of an oriented vinylalcohol polymer/poly(acetylene) copolymer disposed in a pre-selected pattern contiguous with regions of unconverted vinylalcohol polymer. Masks, for example may be used to limit the exposure of the vinylalcohol polymer to preselected areas. These masks may be of any configuration or bear any pattern to impart the desired pattern to the polarizer.

Concurrent with, or subsequent to, the irradiation step, the article may be heated to promote dehydration of the vinylalcohol polymer with concomitant production of the poly(acetylene) blocks on the vinylalcohol polymer backbone. The temperature and duration of such a heating step can affect the optical properties of the finished polarizer. It will be understood that there is a balance between time and temperature for a given optical property. For example, a lower transmission polarizer may be achieved at a given temperature by using longer exposure times. At a given exposure time, lower transmission may by achieved at higher temperatures. Useful temperatures and times are in the range of 90° C. to about 175° C. and times of a few seconds to about five minutes. Generally, if a high transmission polarizer is desired, low heating temperatures are preferred. If a lower transmission polarizer is desired then higher heating temperatures should be used. If the heating and irradiation are concurrent, the heating and exposure times need not be the same.

The optical properties of the resulting polarizer may be improved by processes described in U.S. Pat. No. 5,666,223 (Bennett et al). In particular improvement in photopic and dichroic ratios can be achieved by means of a second orientation step in which the oriented polarizer is stretched a second time from about 5% to about 160%. Such additional orientation may also prevent discoloration of the polarizer and increase the stability to UV radiation.

The process of the present invention may further comprise a stabilization step in which the oriented, irradiated polarizer is contacted with an aqueous borate solution to effect relaxation and crosslinking. Such a step may occur after irradiation and heating, and concurrent with, or subsequent to a second orientation step, if employed. When the polarizer is borated, the stabilizing solution will generally comprise boric acid or alkali borates or mixtures thereof. It is believed that such a boration step provides a layer of polyvinyl orthoborate on the surface of the vinylalcohol polymer.

Generally the concentration of boric acid is greater than the concentration of the borates. Useful solution include, for example, 1 to 6 wt. % borates and 5 to 20 wt % boric acid. The polarizers may be contacted with the borate solutions for from 1 to 10 minutes at temperatures from ambient to about boiling, but is preferably at least about 50 to 85° C. in order to effect swelling of the vinylalcohol film layer prior to crosslinking by the borate.

In addition, the aqueous borate solution washes out the incipient acid, thus preventing further dehydration of the vinylalcohol polymer, and further stabilizes the polarizer against the adverse influences of heat and moisture.

Agents other than borates may be used to stabilize the vinylalcohol film layer. In general any polybasic acid, or derivative thereof such as an ester, can be used in the stabilization step. Another useful stabilization agent is an organosilane, such as those described in U.S. Pat. No. 4,818,624 (Downey), incorporated herein by reference. Such organosilanes are believed to silylate the free hydroxyl groups on the surface of the vinylalcohol polymer. Other means of stabilization agents may include ketal formation with aldehydes, especially dialdehydes and association with inorganic compounds such germanic acids and germanates, titanium salts and esters, chromates and vanadates, and cupric salts and other Group IB salts.

The polarizer of the present invention may be used where polarizer materials have heretofore been used, for example with liquid crystal display panels, sunglasses, sun visors, window glass, glare elimination panels, such as those used with CRT monitors, projection screens and monitors and advertising displays.

EXAMPLES 1–8

A series of poly(isooctyl acrylate-co-acrylic acid) polymers were prepared with varying ratios of isooctyl acrylate (IOA) to acrylic acid (AA). Mixtures containing 80–100 parts by weight of IOA (available from Aldrich, Milwaukee, Wis.), 0–20 parts by weight of AA (available from Aldrich, Milwaukee, Wis.), 0.4 parts by weight of 2,2'-azobis(2-methylbutyronitrile) (available as VAZO 67 from DuPont, Wilmington, Del.), and 150 parts by weight of ethyl acetate (available from EM Science, Gibbstown, N.J.) were prepared and heated at 65° C. for 24 hours. To each of the resulting solutions of polymer was added 0.2 parts by weight of 2,4-bis(trichloromethyl)-6-(3,4-dimethoxyphenyl)-s-triazine as the photoacid generator. The s-triazine may be prepared by the co-trimerization of an aryl nitrile with trichloroacetonitrile in the presence of HCl gas and a Lewis acid such as $AlCl_3$, $AlBr_3$, etc. as described by Wakabayashi et al., Bull. Chem. Soc. Japan, 42, 2924–2930(1969) and by the method described in U.S. Pat. No. 3,987,037 (Bonham).

Using an eight-path wet film applicator, each of the resulting 2,4-bis(trichloromethyl)-6-(3,4-dimethoxyphenyl)-s-triazine containing polymer solutions was coated at a wet thickness of 0.254 mm on a poly(vinyl alcohol) (PVA) film. The PVA film, having a thickness of 12.7–15.2 micrometers, had a draw ratio of 4:1 and was laminated to the poly(vinylidene chloride) primed surface of a 0.152 mm thick poly(ethylene terephthalate) (PET) film. Prior to orientation, the cast PVA film (0.048–0.051 mm in thickness) was obtained from Eastman Kodak (Rochester, N.Y.) and was comprised of polyvinyl alcohol having a degree of polymerization of about 2000 and a level of hydrolysis of 98–99 mole %. The resulting coatings were dried for 15 minutes at 65° C. PET films (0.051 mm thick) without and with a silicone low-adhesion backsize (LAB) surface coating were laminated to the resulting acid donor layer surfaces. When present the LAB surface contacted the acid donor layer. The resulting sandwich constructions with diffusion barrier layers were exposed to UV light (two F40/350 BL fluorescent tubes, available from Sylvania, Danvers, Mass.) for 3 minutes (about 240 $mJ/cm^2$) and then heated for 60 minutes at 105° C. All of the constructions turned to a maroon color after the UV light and heat exposure, indicating dehydration of the PVA film. The PET or PET/LAB was removed from each construction and the poly(isooctylacrylate-co-acrylic acid) was washed off of the partially dehydrated PVA film with ethyl acetate. The ultraviolet—visible absorption spectra of the resulting partially dehydrated PVA films were run in a UV/VIS spectrophotometer having a polarizer placed in both the sample and reference beams, with the orientation axis of the PVA film placed parallel and then placed perpendicular to the optical axis of the polarizer in the sample beam. The dichroic ratio of each construction was calculated by dividing the absorbance (A) (at the wavelength of maximum absorbance (λ max)) of the construction in the parallel (=) position by the absorbance (A) at the same wavelength in the perpendicular (⊥) position ($R_D = A_=/A_\perp$) These results are shown in Table 1.

EXAMPLE 9

Figure 2:
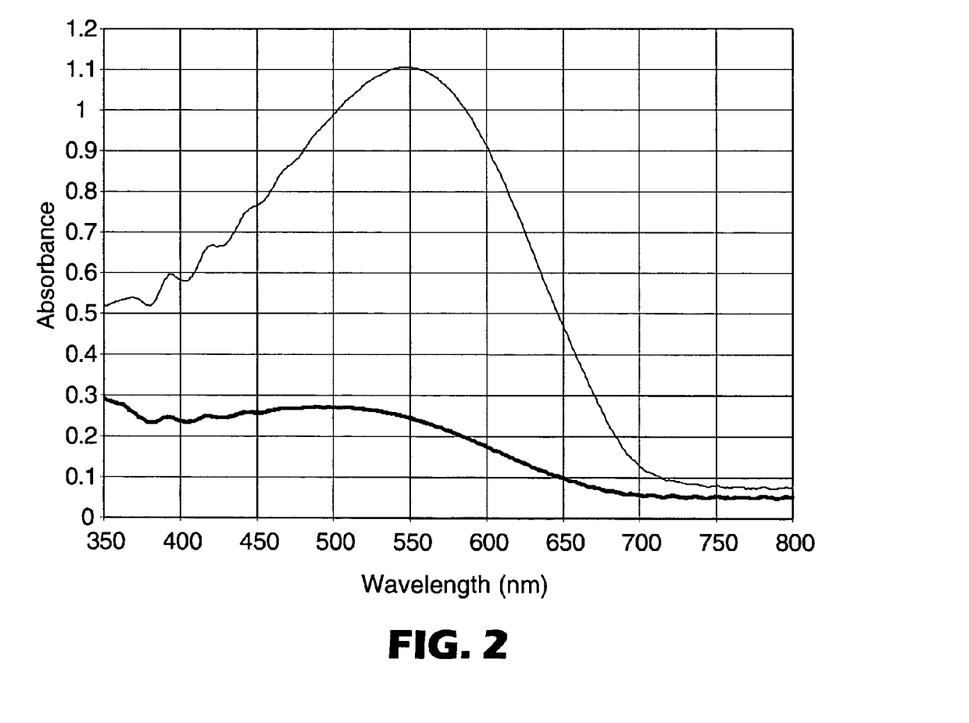
FIG. 2 is a plot of the absorbance vs. wavelength of the polarizer of Example 9L.

Sandwich constructions with PET diffusion barrier layers were prepared as in Example 3, except that 96 parts by weight of IOA, 4 parts by weight of AA, and 0.5 parts by weight of 2,4-bis(trichloromethyl)-6-(3,4-dimethoxyphenyl)-s-triazine were used. The resulting constructions were exposed to UV light and heat as in Examples 1–8, except that exposure times were varied. The PET was removed from each exposed construction and the poly(isooctylacrylate-co-acrylic acid) was washed off of the partially dehydrated PVA film with ethyl acetate. The absorption spectra of the resulting exposed partially dehydrated PVA films were run and $R_D$ was determined as in Examples 1–8. The results are shown in Table 2. Representative spectra are shown in FIG. 2 using Sample 9L.

TABLE 2

Effect of UV and Thermal Exposure Times on Optical Properties of Oriented PVA Film in Sandwich Constructions

| Sample | UV Exposure Time (min) | 105° C. Exposure Time (min) | $R_D$ | A(=)at λ max | A (⊥) | λ max (nm) |
|---|---|---|---|---|---|---|
| 9A | 3 | 0 | NA | $NA^2$ | $NA^2$ | NA |
| 9B | 3 | 1 | NA | $NA^2$ | $NA^2$ | NA |
| 9C | 3 | 5 | NA | $NA^2$ | $NA^2$ | NA |
| 9D | 3 | 10 | 1.558 | 0.0927 | 0.0595 | 521 |
| 9E | 3 | 20 | 2.41 | 0.1788 | 0.0742 | 533 |
| 9F | 3 | 30 | 3.486 | 0.3228 | 0.0926 | 541 |
| 9G | 3 | 40 | 3.047 | 0.5402 | 0.1773 | 541 |
| 9H | 3 | 60 | 4.285 | 0.8756 | 0.2044 | 547 |
| 9I | $5^1$ | 10 | 1.46 | 0.0882 | 0.0604 | 521 |
| 9J | 5 | 20 | 2.727 | 0.2214 | 0.0812 | 541 |
| 9K | 5 | 40 | 3.941 | 0.6397 | 0.1623 | 541 |
| 9L | 5 | 60 | 4.468 | 1.1053 | 0.2474 | 548 |

[1] At an exposure time of 5 minutes the UV light dose was 400 $mJ/cm^2$.
[2] Absorbance was too low to be meaningful.
NA means not applicable.

The results in Table 2 show that increased time of exposure to heat and UV increased the dichroic ratio in the PVA film.

TABLE 1

Effect of Acid Donor Layer Composition and Barrier Layer on Optical Properties of Oriented PVA Film

| Example | Barrier Layer Film | IOA (parts by weight) | AA (parts by weight) | $R_D$ | A (=) at λ max | A(⊥) | λ max (nm) |
|---|---|---|---|---|---|---|---|
| 1 | PET | 100 | 0 | 2.333 | 0.1549 | 0.0664 | 523 |
| 2 | PET/LAB | 100 | 0 | 1.901 | 0.1194 | 0.0628 | 523 |
| 3 | PET | 95 | 5 | 2.336 | 0.1988 | 0.0851 | 541 |
| 4 | PET/LAB | 95 | 5 | 2.988 | 0.2827 | 0.0946 | 540 |
| 5 | PET | 90 | 10 | 1.948 | 0.1459 | 0.0749 | 523 |
| 6 | PET/LAB | 90 | 10 | 2.402 | 0.1619 | 0.0674 | 527 |
| 7 | PET | 80 | 20 | 2.865 | 0.2418 | 0.0844 | 542 |
| 8 | PET/LAB | 80 | 20 | 1.971 | 0.1279 | 0.0649 | 523 |

The results in Table 1 show that the oriented PVA film in Examples 1–8 was partially dehydrated, causing the film in each Example to become a polarizer as shown by the measured $R_D$ values, which were all significantly greater than 1.

EXAMPLE 10

A resin syrup was prepared by combining 80 parts by weight of IOA, 20 parts by weight of isobornyl acrylate (available from Aldrich, Milwaukee, Wis.), and 0.2 parts by weight of benzil dimethyl ketal (available as Esacure™ KB-1 from Sartomer Co., West Chester, Pa.), sparging the resulting solution with nitrogen for about 15 minutes, exposing the mixture to UV light (two F40/350 BL fluorescent tubes) until the viscosity reached 2000–3000 cps, and then quenching with oxygen. The resulting syrup (100 parts by weight) was mixed with 0.2 parts by weight of 2,4-bis (trichloromethyl)-6-(3,4-dimethoxyphenyl)-s-triazine. The resulting solution was coated at a nominal thickness of 0.127 mm onto a PVA film, formed into a sandwich construction, and exposed to UV light for 3 minutes followed by heat for 45 minutes essentially as in Example 9. A maroon color characteristic of the poly(acetylene) chromophores developed, indicating that a polarizer film was formed.

EXAMPLE 11

A sandwich construction was prepared as in Example 9, except that 0.2 parts by weight of 2,4-bis(trichloromethyl)-6-(p-hydroxyethoxystyryl)-s-triazine was used as the photoacid generator, and the polymer solution coating was dried for a minimum of 20 minutes prior to lamination with the PET film. The s-triazine may be prepared as described in Examples 1–8. The sandwich construction was exposed to UV light (5 passes at 1.52 m/min in a Fusion UV Processor with a D bulb, available from Fusion UV Systems, Inc., Gaithersburg, Md.) and then heated for 25 minutes at 104° C. A very light maroon color formed in the PVA film, indicating that a polarizer film was produced.

EXAMPLE 12

Example 11 was repeated except that 2,4-bis(trichloromethyl)-6-(3,4-dimethoxyphenyl)-s-triazine was used as the photoacid generator. A much darker maroon color was formed, indicating that a polarizer film was formed and that 2,4-bis(trichloromethyl)-6-(3,4-dimethoxyphenyl)-s-triazine was more effective in generating acid than the triazine used in Example 11.

EXAMPLES 13–15

Sandwich constructions were prepared as in Example 6, except that 0.1, 1, and 5 parts by weight of the photoacid generator (PAG) were used. The constructions were exposed to UV light (883 mJ/cm$^2$, Fusion UV Processor with a D bulb, 15.2 m/min) to generate hydrochloric acid and then placed in an oven at 165° C. for 3 minutes to dehydrate the PVA film. The PET/LAB was removed from each construction and the poly(isooctylacrylate-co-acrylic acid) was washed off of the partially dehydrated PVA film with ethyl acetate. The optical properties of each of the resulting PVA films were determined as in Examples 1–8, and the results are shown in Table 3.

TABLE 3

Effect of Photoacid Generator Level on Optical Properties of PVA Film

| Example | PAG (parts by weight) | $R_D$ | A (=) at λ max | A(⊥) | λ max (nm) |
|---|---|---|---|---|---|
| 13 | 0.1 | NA | NA[1] | NA[1] | NA |
| 14 | 1 | 6.066 | 2.3742 | 0.3914 | 566 |
| 15 | 5 | NA | NA[2] | NA[2] | NA |

[1]Absorbance was too low to be meaningful.
[2]Absorbance was too high to measure.
NA means not applicable.

The results in Table 3 show that when the level of photoacid generator was increased, the absorbance in the parallel position increased dramatically.

EXAMPLE 16

Example 13, which used 1 part by weight of photoacid generator, was repeated, except that the constructions were heated for 10 minutes at 105° C., 135° C., or 165° C. The results are shown in Table 4.

TABLE 4

Effect of Dehydration Temperature on Optical Properties of PVA Film

| Sample | Temperature | $R_D$ | A(=) at λ max | A (⊥) | λ max (nm) |
|---|---|---|---|---|---|
| 16A | 105° C. | 2.882 | 0.2291 | 0.0795 | 551 |
| 16B | 135° C. | 4.298 | 3.5176 | 0.8185 | 547 |
| 16C | 165° C. | NA | NA[1] | NA | NA |

NA means not applicable.
[1]Absorbance was too high to measure.

EXAMPLE 17

Figure 3:
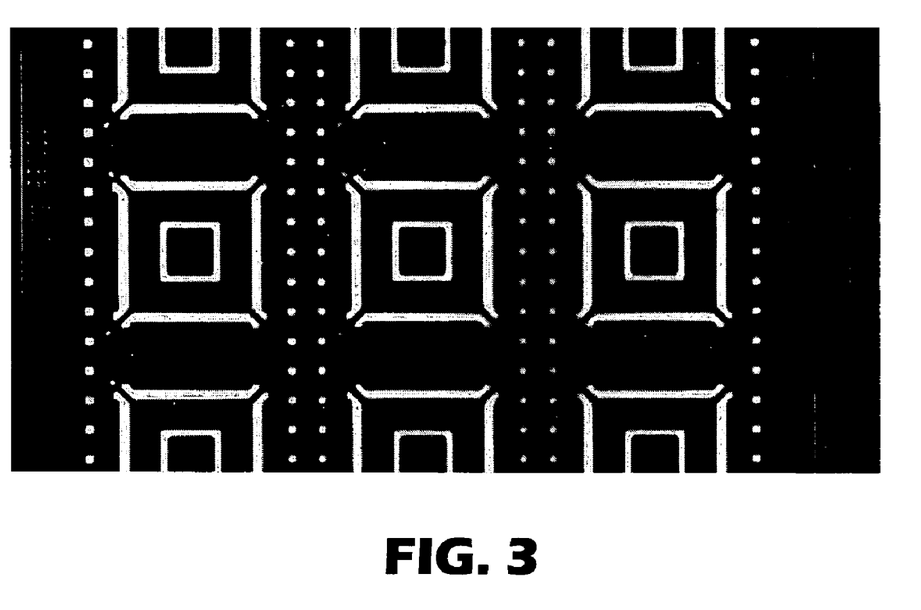
FIG. 3 is a digital image of a patterned polarizer of Example 17.

A mixtures containing 95 parts by weight of IOA, 5 parts by weight of acrylamide (available from Aldrich, Milwaukee, Wis.), 0.4 parts by weight of 2,2'-azobis(2-methylbutyronitrile), and 150 parts by weight of ethyl acetate were prepared and heated at 65° C. for 24 hours. To the resulting solution of polymer was added 5 parts by weight of 2,4-bis (trichloromethyl)-6-(3,4-dimethoxyphenyl)-s-triazine as the photoacid generator. A sandwich construction was made using the resulting polymer solution as in Example 6. A mask having a pattern of open areas was placed on the construction, and the masked construction was exposed to UV light (883 mJ/cm$^2$, Fusion UV Processor with a D bulb, 15.2 m/min) and then heated at 105° C. for 1.75 hours. The PET/LAB was removed and the poly(isooctylacrylate-co-acrylamide) was removed from the resulting patterned, partially dehydrated PVA film with ethyl acetate. FIG. 3 shows the resulting pattern of dark maroon areas, which were polarizing, and the colorless unexposed areas which were not polarizing.

EXAMPLE 18

A PVA film on a PET support as described in Example 1 was mounted on a glass slide with the PVA film facing up. A monomer solution comprising 65 weight percent poly (ethylene glycol) acrylate (400 molecular weight, available from Sartomer Co.), 35 weight percent 2-hydroxyethyl methacrylate (available from Aldrich), 0.1 weight percent 4-(2-hydroxyethoxy)phenyl-(2-hydroxy-2-propyl) ketone (available as Irgacure 2959 from Ciba Specialty Chemicals) was prepared. To 100 parts by weight of this solution was added 20 parts by weight of a solution of triaryl sulfonium chloride (50 weight percent in water, available from Aceto Corp., Lake Success, N.Y.). The resulting sulfonium salt containing solution was coated onto the PVA film to a thickness of about 0.63 mm and contained on the film with 0.63 mm thick tape surrounding the PVA film. A PET barrier film was placed over the solution and the resulting construction was exposed to UV light for 15 minutes as in Examples 1–8 (about 1200 mJ/cm$^2$). The sample was then placed in an oven at 165° C. for 15 minutes. The resulting construction turned maroon in color, indicating the formation of poly(acetylene) chromophores in the area covered by the sulfonium salt containing layer.

We claim:

1. A pre-polarizing article comprising:
   an oriented vinylalcohol polymer film layer, and
   an acid donor layer comprising a photoacid generator.
2. The pre-polarizing article of claim 1 wherein exposure to radiant and thermal energy effects partial dehydration of the vinylalcohol polymer to a poly(vinyl alcohol)/poly(acetylene) copolymer to produce a polarizing article.
3. The article of claim 1 wherein said acid donor layer comprises a coating of said photoacid generator on said vinylalcohol polymer film layer.
4. The article of claim 1 wherein said acid donor layer comprises mixture of said photoacid generator and a polymer having a glass transition temperature of less than 25° C.
5. The article of claim 1 wherein said acid donor layer comprises mixture of said photoacid generator and an amorphous polymer.
6. The article of claim 1 wherein said acid donor layer comprises mixture of said photoacid generator and a hydrophobic polymer.
7. The article of claim 4 wherein said donor polymer layer is an adhesive layer.
8. The article of claim 1 wherein said vinylalcohol polymer comprises polymers and copolymers of monomers of the formula:

wherein R is H, a $C_1$–$C_8$ alkyl, or an aryl group; and R' is H, or a hydrolysable functional group.

9. The article of claim 1 wherein said vinylalcohol polymer comprises copolymers of the formula:

where R is hydrogen or methyl;
$R^1$ is a $C_6$–$C_{18}$ acyl group
y is 0 to 30 mole %;
z is 0.5 to 8 mole %; and
x is 70 to 99.5 mole %.

10. The article of claim 1 wherein said vinylalcohol polymer is selected from the group consisting of poly(vinylalcohol), and ethylene/vinyl alcohol copolymers.
11. The article of claim 1 wherein said article further comprises a support layer.
12. The article of claim 11 wherein said support layer is bonded to said oriented, vinylalcohol polymer film layer.
13. The article of claim 11 wherein said support layer is bonded to said donor layer.
14. The article of claim 1 wherein said photoacid generator is selected from the group of onium salts, organometallic salts, organosilanes, latent sulfonic acids halomethyl triazines and chlorinated acetophenones.
15. The article of claim 1 wherein said photoacid generator is used in amounts of 0.1 to 30 wt. %, relative to the amount of vinylalcohol polymer.
16. The article of claim 1 wherein said article comprises a vinylalcohol polymer film layer, a diffusion barrier layer, and said donor layer disposed therebetween.
17. The article of claim 1 wherein said vinylalcohol polymer layer is stabilized with a polybasic acid or derivative thereof.
18. The article of claim 17 wherein said vinylalcohol polymer layer is stabilized with borate.
19. The article of claim 1 comprising first and second oriented, vinylalcohol layers and a donor layer disposed therebetween.
20. The article of claim 19 further comprising a barrier layer on each exposed surface of the oriented vinylalcohol layers.
21. The article of claim 1 comprising alternating layers of oriented vinyl alcohol polymer and donor layer.
22. A K-type polarizer prepared by exposing the pre-polarizing article of claim 1 to radiant energy.
23. A K-type polarizer comprising at least one layer of an oriented poly(vinyl alcohol)/poly(acetylene) copolymer and an acid donor layer containing residue from a photoacid generator.
24. The polarizer of claim 23 wherein said acid donor layer comprises a mixture of said residue and a polymer having a glass transition temperature of less than 25° C.
25. The polarizer of claim 23 wherein said acid donor layer comprises a mixture of said residue and an amorphous polymer.
26. The polarizer of claim 23 wherein said donor polymer layer comprises a mixture of said residue and a hydrophobic polymer.
27. The polarizer of claim 23 wherein said donor layer comprises a mixture of said residue and an adhesive.
28. The polarizer of claim 23 wherein said poly(vinyl alcohol)/poly(acetylene) copolymer has the general structure:

where —$(CH_2$—$CHOH)_a$— represent blocks of poly(vinyl alcohol), —$(CH$=$CH)_b$— represents conjugated blocks of poly(acetylene), a and b are numbers such that a+b is at least 500, a>b, and b is sufficiently large to produce a conjugated chromophore.

29. The polarizer of claim 23, wherein said poly(vinyl alcohol)/poly(acetylene) copolymer is disposed in a preselected pattern.

* * * * *

UNITED STATES PATENT AND TRADEMARK OFFICE
CERTIFICATE OF CORRECTION

PATENT NO. : 6,998,179 B2 Page 1 of 1
APPLICATION NO. : 10/872749
DATED : February 14, 2006
INVENTOR(S) : Duane D. Fansler It is certified that error appears in the above-identified patent and that said Letters Patent is hereby corrected as shown below:

On Page 2, in Col. 1 item 56, under (U.S. Patent Documents)
Line 23, delete "Gordon" and insert -- Trapani --, therefor.
Line 24, delete "Fitzsimons" and insert -- Fansler --, therefor.

Col. 1
Line 48, before "formed" delete "In".

Col. 5
Line 18, delete "8mol" and insert -- 8 mol --, therefor.

Col. 7
Line 56, after "Coatings" insert -- , --.

Signed and Sealed this

Fifteenth Day of April, 2008

JON W. DUDAS
*Director of the United States Patent and Trademark Office*